Figure 3:
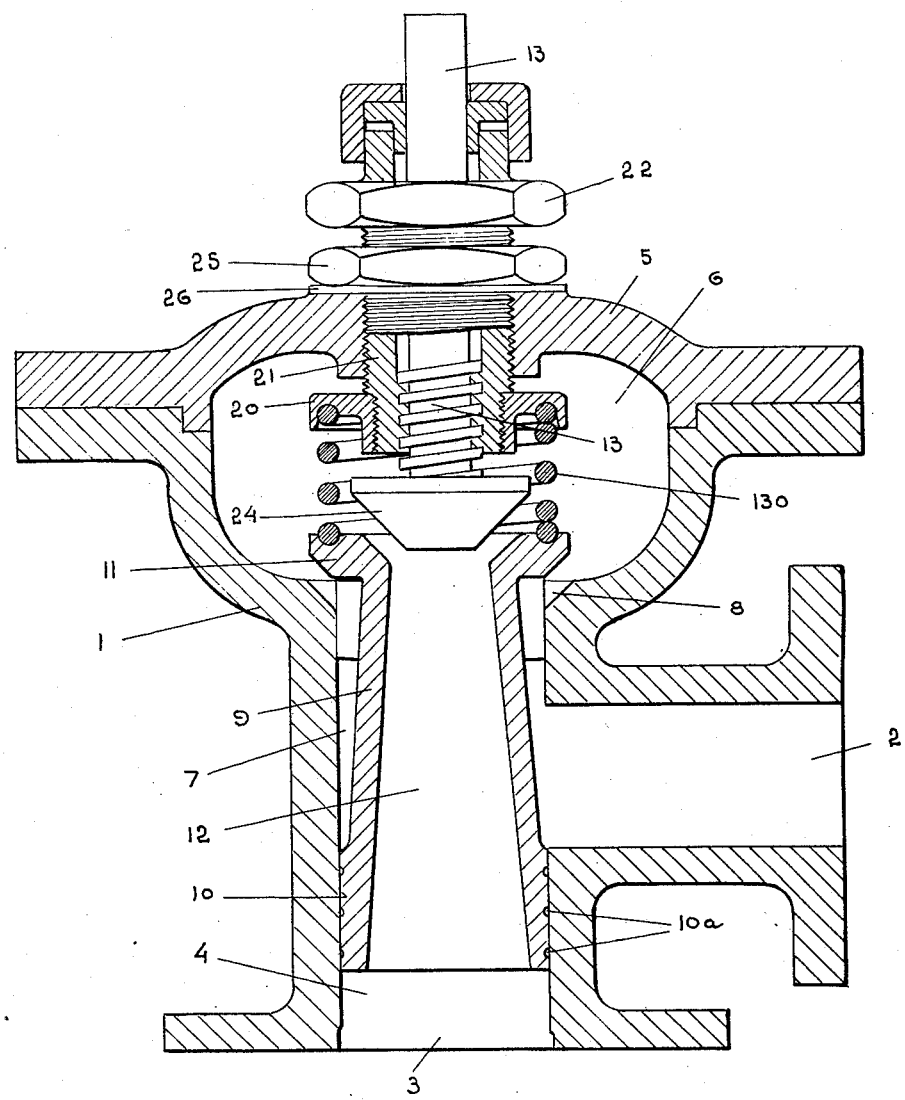

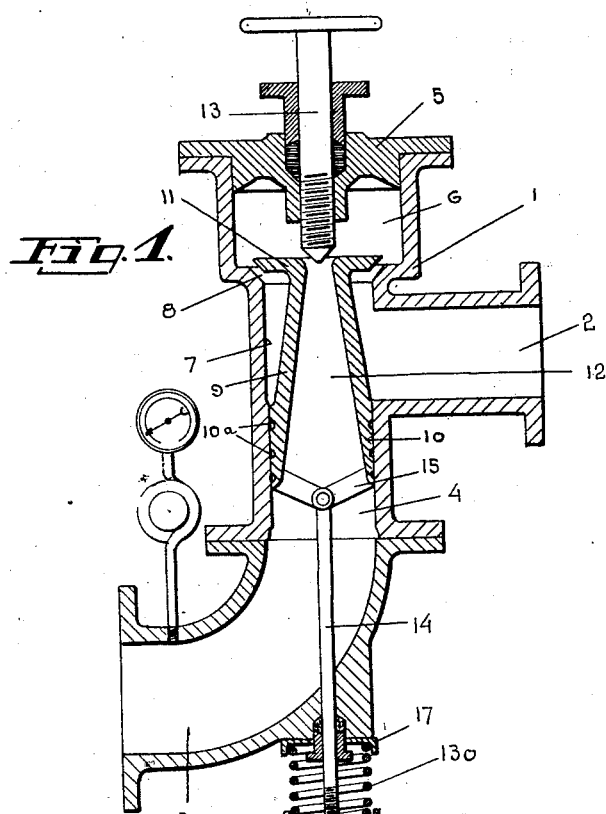

Patented May 31, 1932

1,861,375

UNITED STATES PATENT OFFICE

JOHAN THEODOR AHNBERG, OF GOTTENBORG, SWEDEN

PRESSURE REDUCING VALVE

Application filed February 19, 1930, Serial No. 429,692, and in Sweden November 2, 1928.

The present invention relates to pressure reducing valves of the kind in which a movable valve disk controlling the section of passage of the valve is connected to a piston subjected to the pressure on the high pressure side of the valve.

The object of the invention is to provide a pressure reducing valve of the kind referred to which is simple and reliable. As the valve according to this invention is not provided with pressure-actuated diaphragms which easily can be damaged this valve is especially adapted to be used in such cases where considerable pressures are to be reduced, for instance in connection with Diesel motors.

In the accompanying drawings some embodiments of the invention are shown by way of example, whereby Figure 1 is a longitudinal section through a valve according to the one embodiment;

Figure 2 is a diagrammatical longitudinal section through a valve according to another embodiment; and Figure 3 is a similar section through a valve according to a further embodiment.

In the several figures like numerals of reference refer to like parts.

Referring first to Figure 1 1 denotes a valve box or casing having an inlet 2 and an outlet 3 which casing near the outlet 3 is formed with a cylindrical portion and at the other end with a chamber 6 covered by a cover 5. The casing 1 is provided with a seating 8 situated between the chamber 6 and a central portion 7 of the casing to the interior of which portion the inlet 2 is connected. Within the casing 1 there is movably mounted a member 9 the cylindrical, piston-shaped end 10 of which is slidably in the cylindrical portion 4 of the casing and the other end of which is formed as a valve disk 11 of a slight greater diameter than the piston-shaped portion 10 which disk is adapted to co-operate with the seating 8. The piston-shaped portion 10 is provided with packing devices 10a.

The member 9 is provided with a central funnel-shaped channel 12 in which the medium passing through the valve expands during its passage. A screw-threaded spindle 13 passes through a threaded hole in the cover 5, and by turning this spindle in the one or other direction the section of passage at the inlet to the channel 12 can be adjusted by means of the inner end of the spindle.

The member 9 is actuated by a spring 130 which tends to bring the valve disk 11 against the seating 8. The action of the spring 130 is transmitted to the member 9 by means of a spindle 14 the one end of which is connected to the cylindrical portion of the member 9 by means of arms 15. The other end of the spindle passes through the wall of the outlet 3 and is provided with a disk 16 between which and an abutment 17 the spring 130 is compressed.

On account of the above mentioned relation between the size of the piston-shaped portion 10 and the valve disk 11 the pressure in the chamber 6 during the action of the valve will be smaller than the pressure in the inlet 2 and in the interior of the central portion 7, the reduction of the pressure being besides said size relation dependent on the weight of the member 9 and the action of the spring 130.

When passing through the channel 12 the pressure of the medium will further diminish whereby, if the medium consists of saturated or wet steam, this will get dried. By adjusting the pressure of the spring 130 any desired relation between the pressure on the high-pressure side of the valve and the pressure on the low-pressure side of the same can be obtained. It is also obvious that by adjusting the spindle 13 the quantity of medium passing through the valve per unit of time can be varied.

According to the embodiment shown in Figure 2 the member 9 is not actuated by a spring but its weight is so chosen that the desired reduction of pressure of the medium passing through the valve is obtained.

According to the embodiment shown in Figure 3 the spring 130 acting upon the member 9 is situated within the chamber 6 of the valve box 1. The spring rests with its one end against the member 9 and with its other end against an annular flange 20 fixed to a screw-threaded socket 21 screwed through a threaded hole in the cover 5. The socket is outside the valve box provided with a nut-shaped portion 22 and by turning the socket the compression of the spring 130 can be varied. The socket 21 is also interiorly screw-threaded and through the socket passes the screw-threaded spindle 13 which at its inner end is provided with an enlarged head 24 adapted to limit the free section of passage at the inlet to the channel 12 which section obviously can be varied by turning the spindle 13. On the socket 21 there is a lock nut 25 and between this and the cover 5 a packing disk 26 is interposed.

What I claim is:

1. A pressure reducing valve comprising a valve box having an inlet and an outlet and formed with a chamber therein, a piston movable within said valve box, a valve disk connected with said piston and controlling the passage between said inlet and chamber in the valve box, a channel passing through said piston and said valve disk and establishing communication between the chamber and the outlet in the valve box, and a screw-threaded spindle projecting into said chamber and adapted to adjustably limit the section of passage of said channel.

2. A pressure reducing valve comprising a valve box provided with a cylindrical portion having an inlet and an outlet, a chamber formed with said box and arranged at one end of the cylindrical portion of the latter past the inlet and outlet thereof, a valve seat disposed between said cylindrical portion and chamber, a minimum sectional area of said seat being larger than the sectional area of said cylindrical portion, a piston slidably mounted in said cylindrical portion and interposed between the inlet and outlet, a valve disk carried by said piston and cooperating with said valve seat to control the communication between the chamber and outlet, and a channel passing through said piston and valve disk and establishing communication between said chamber and said outlet.

3. A pressure reducing valve comprising a valve box provided with a cylindrical portion having an inlet and an outlet, a chamber formed with said box and arranged at one end of the cylindrical portion of the latter past the inlet and outlet thereof, a valve seat disposed between said cylindrical portion and chamber, the minimum sectional area of said seat being larger than the sectional area of said cylindrical portion, a piston slidably mounted in said cylindrical portion and interposed between the inlet and outlet, a valve disk carried by said piston and cooperating with said valve seat to control the communication between the chamber and outlet, and a channel passing through said piston and valve disk and establishing communication between said chamber and said outlet, and a screw-threaded spindle projecting into said chamber and adapted to adjustably limit the section of passage of said channel.

In witness whereof I have hereunto set my hand.

JOHAN THEODOR AHNBERG.